United States Patent
Ranganathan et al.

[11] Patent Number: 5,931,961
[45] Date of Patent: *Aug. 3, 1999

[54] DISCOVERY OF ACCEPTABLE PACKET SIZE USING ICMP ECHO

[75] Inventors: Murali Ranganathan, Cupertino; Guy G. Riddle, Los Gatos, both of Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/646,934

[22] Filed: May 8, 1996

[51] Int. Cl.⁶ .................................................. G06F 11/00
[52] U.S. Cl. ...................... 714/712; 340/514; 340/853.2
[58] Field of Search ............................. 371/20.1, 30, 32, 371/33, 20.3, 48; 395/200.2; 370/60, 94.1, 85.9; 340/853.2, 514, 524, 870.16, 825.08, 825.06, 825.16, 870.31

[56] References Cited

U.S. PATENT DOCUMENTS

| | | | |
|---|---|---|---|
| 4,926,415 | 5/1990 | Tawara et al. | 370/60 |
| 5,384,770 | 1/1995 | Mays et al. | 570/43 |
| 5,502,726 | 3/1996 | Fischer | 370/94.1 |
| 5,530,808 | 6/1996 | Hammond et al. | 395/200.2 |

*Primary Examiner*—Phung M. Chung
*Attorney, Agent, or Firm*—Blakely, Sokoloff, Taylor & Zafman

[57] ABSTRACT

A network messaging protocol is used to send an arbitrary size packet over the network from a source machine to a destination machine. If the packet is accepted by the routers along the path of the potential network connection, then the destination machine will be able to echo the test message packet back to the source machine and an acceptable packet size is set equal to the test message packet size. If not, after a suitable time out, the source machine will send another test message with a different packet size than the initial arbitrary packet size and wait for echo and repeat the process until an acceptable packet size is discovered.

18 Claims, 8 Drawing Sheets

FORMAT OF A UDP PACKET 200

| 0 | 16 | 31 |
|---|---|---|
| SOURCE PORT | | DESTINATION PORT |
| LENGTH | | UDP CHECKSUM |
| DATA.... | | |

| 0 | 8 | 16 | 31 |
|---|---|---|---|
| SOURCE PORT | | DESTINATION PORT | |
| SEQUENCE NUMBER | | | |
| ACKNOWLEDGEMENT NUMBER | | | |
| OFF. | RES. | CODE | WINDOW |
| CHECKSUM | | URGENT POINTER | |
| OPTIONS | | | PADDING |
| DATA ... | | | |

FORMAT OF A TCP PACKET 250

FIG. 3

DISCOVERY OF ACCEPTABLE PACKET SIZE USING ICMP ECHO

BACKGROUND OF THE INVENTION

(1) Field of the Invention

The present invention relates to networking of computer systems. More specifically, the present invention relates to optimizing the transfer of information over a network.

(2) Description of Related Art

In transmitting data over a computer network, many different protocols have been established. Chief among these protocols is the Internet Protocol, or IP. IP allows many different types of data transfer from one machine to another machine and, thus, the network of routers, gateways and other devices which form pathways on the "Internet" is commonly configured to understand IP. Ordinary file transfer, either binary or ASCII, is performed using another protocol known as Transmission Control Protocol (TCP), which runs over IP. TCP/IP is the standard protocol by which most computers transmit information over networks. The Internet, which is a network of networks, is composed of many routers, gateways and other devices which are used to transfer "packets" of information from a source machine (source node), to a destination machine (destination node). The TCP/IP protocol utilized on the Internet is known as a "reliable" data transmission protocol because when routers cannot transfer information that is submitted to them to another router or device, the information is re-sent from the source, or rerouted along the path, until it can finally be transmitted to the destination machine.

Another protocol, the User Datagram Protocol (UDP) is said to be an "unreliable" data transmission protocol. It is called "unreliable" because when a UDP transmission is sent over routers in a network, if one router drops a packet of the UDP transmission, the dropped packet of information is lost forever and no attempt is made to re-send the data to the destination machine.

A major circumstance in which routers drop UDP packets of information is where an older model router cannot transfer a packet because the packet size is too large (e.g. 1500 bytes over an ISDN router). Many older model routers will drop a UDP packet of any size larger than it has been manufactured to transfer and in the UDP case, since no retry to re-send the packet is made, the data in the packet is lost forever. UDP is unreliable and is therefore suited to the transmission of video and audio frames, for example, where it is not critical that every single packet of information be transferred across the network to the destination machine.

Thus, the accepted practice is to tolerate a lost video frame occasionally while continuing to stream remaining frames in an attempt to preserve the real-time nature of the video transmission. UDP fits this practice well and therefore can be used for video and audio streaming.

Most routers handle TCP packets irrespective of their large packet size by a method known as "fragmenting". Using fragmenting, when a larger packet enters a router, it is fragmented into smaller size packets that can be transferred through the router and onto the next router in the pathway. However, routers (old and new) fail to employ fragmenting for UDP packet transmission.

Thus, there is needed a method and apparatus which can guarantee that UDP packets are transmitted over the network successfully, such that large UDP packets are not dropped by a router merely because the router cannot transfer large size packets, while keeping the protocol unreliable.

SUMMARY OF THE INVENTION

An embodiment of the present invention provides a method and apparatus for discovering an acceptable size packet which a network can successfully transfer from a source machine to a destination machine.

First, an initial size is chosen to be the testing size. Then, the source machine generates a test message the size of the testing size encapsulating it in a test message packet and then sends the test message packet to the destination. The source machine checks during a specified timeout period whether the test message packet is successfully echoed back. If the test message packet is successfully echoed back to the source machine during the timeout period, then the acceptable packet size is set equal to the testing size. If not, a new size, typically a smaller size, is chosen as the new testing size and a new test message packet the size of the new testing size is sent and the process repeats until an acceptable packet size can be found.

Alternatively, rather than send one test message packet and wait the timeout period, several test message packets, each of a different size can be sent consecutively. Then, during a specified timeout, the largest size of all successfully returned test message packets is set as the acceptable packet size.

Further, the specified timeouts used in discovering an acceptable packet size can also be discovered by sending a null or one-byte test message in a timeout test message packet, and then measuring the time it takes for the timeout test message packet to return.

Periodically, discovery of the acceptable packet size between the same source machine and destination machine may reoccur to ensure better reliability since the network pathway, and consequently the largest acceptable packet size, may be altered during the time of data transmission by a user.

BRIEF DESCRIPTION OF THE DRAWINGS

FIG. 3 is a diagram showing TCP and UDP data encapsulation formats.

DETAILED DESCRIPTION OF THE INVENTION

Figure 1:
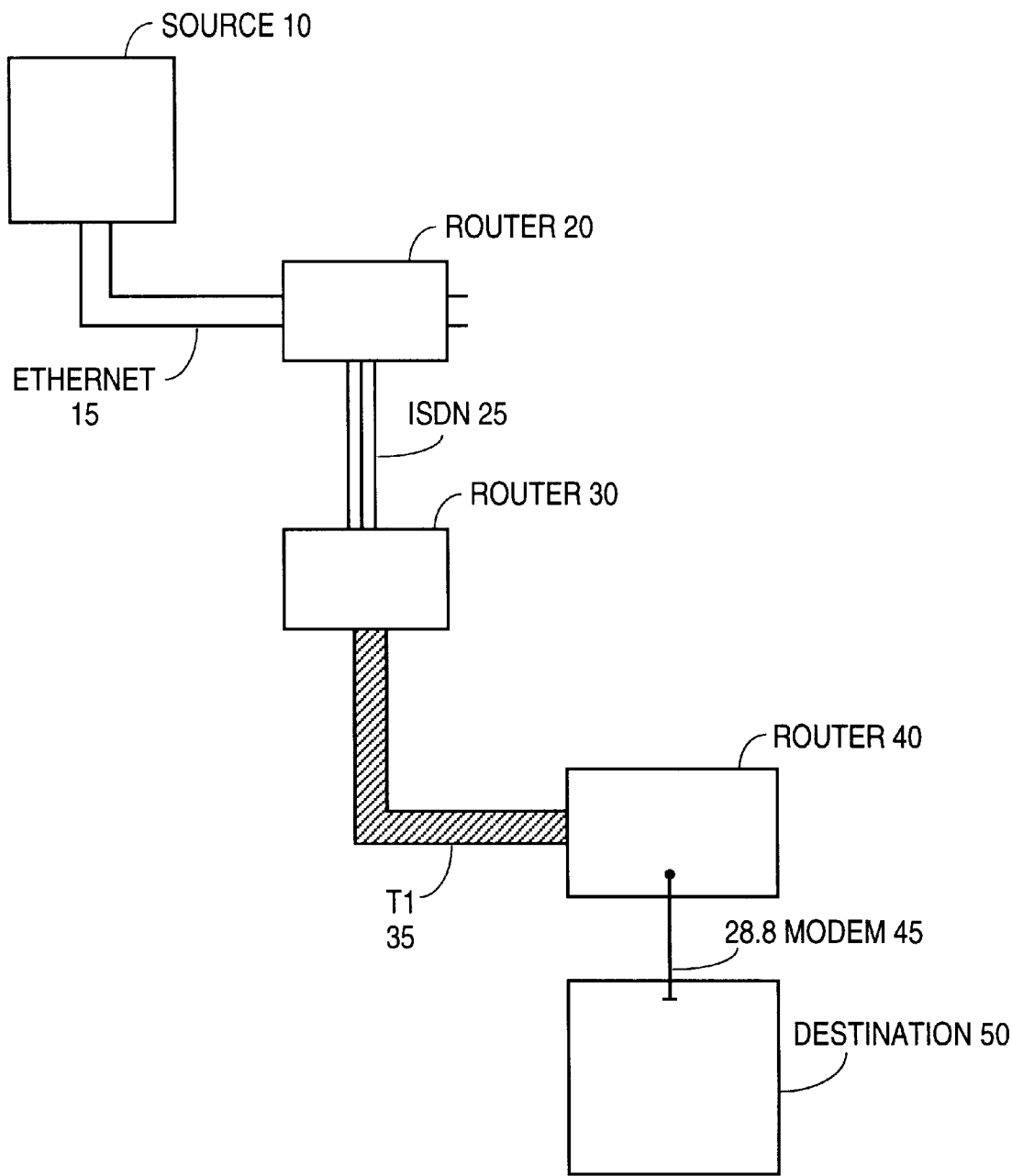
FIG. 1 is a diagram showing exemplary components of a network in which the various embodiments of the present invention may be utilized.

FIG. 1 is a diagram showing exemplary components of a network in which the various embodiments of the present invention may be utilized.

A source machine 10, is connected over a network of routers to a destination machine 50. Source machine 10 is shown connected via Ethernet 15 to a first router 20. Router 20 is then shown connected to a second router 30 over an Integrated Services Digital Network (ISDN) connection 25. Router 30 then makes its connection over a T1 connection (a direct Internet line) 35, to a third router 40. Finally, the destination machine 50 is connected through an ordinary 28.8 modem connection 45 to router 40.

The router and connection topology shown is exemplary of the rich variety of different types of devices/interconnects that are capable of transferring information across networks. Some routers are limited in the largest size of packets that they can theoretically transit. The type of routers shown in FIG. 1 are called "bridging" routers in that they transfer data from one type of connection (like Ethernet) to another type of connection (like ISDN). However, other routers which are not bridging routers, but rather are pure in that they do not bridge one type of data connection to another, are also equally likely to occur in the topology over which the various embodiments of the present invention operate.

The packet sizes most commonly available today range anywhere from about 4000 bytes down to 256 bytes. If the source machine 10 were connecting over a Fiber Distributed Data Interface (FDDI), the typical maximum packet size capability of the FDDI connection would be about 4000 bytes. For an Ethernet connection, a packet size capability of around 1470 bytes is typical. For an ISDN connection, a size capability of around 1024 bytes is typical, while for most modems, a typical capability is 512 bytes. Thus, currently, a "large" packet size would refer to 3800 bytes or 1470 bytes, while a "small" size would be 512 bytes. However, the various embodiments of the present invention are not limited by the actual sizes available since the art may progress to a state where 3800 bytes is considered to be "small" rather than "large".

If a 1024 byte packet of data is to arrive from source machine 10 over the network to destination machine 50, then that packet rust be transferred successfully across all of the routers 20, 30 and 40. In the case of an ordinary file transfer, utilizing TCP/IP, The 1024 byte packet of data would arrive at router 20 and router 20 would recognize that it has a maximum packet size capability of 1500 bytes. Therefore, the entire 1024 byte packet of data would be transferred across router 20 without size conflict over ISDN connection 25 and onto the router 30. However, at router 30, the 1024 byte packet of data would be rejected as too large if we assume that router 30 is designed to only have a maximum packet size capability of 512 bytes. At this point, in the case of a TCP/IP transmission, the 1024 byte TCP packet is fragmented into two 512 byte packets of data, such that it may successfully be transferred across the router 30. Router 30 is therefore able to transfer the two 512 byte packets of data over the T1 connection 35 to router 40. At router 40, the two 512 byte packets of data are successfully transferred if we assure router 40 has a maximum packet size capacity of 1024 bytes and thus, can readily handle the 512 byte packets. Finally, the two 512 byte packets are sent by router 40 over the modem 45 to arrive at the destination machine 50.

But, when transferring an identical size (1024 byte) UDP data packet, a serious problem occurs along the path of routers described in FIG. 1. Assuming an identical 1024 byte packet size, but the packet carries UDP data, instead of TCP, the 1024 byte UDP packet is transferred easily (with respect to size conflict from source machine 10) over Ethernet connection 15 and onto the router 20, which is assumed to have a maximum packet size capability of 1500 bytes. But, when the UDP packet is transferred from router 20 over ISDN connection 25 to router 30, though it may successfully reach router 30, it may never leave or be transferred across router 30 because router 30, in our example, has a maximum packet size capability of only 512 bytes. Unlike the TCP case, the 1024 byte UDP packet is not fragmented, nor is a retry issued from the source machine, such that the data can be fragmented and re-sent over the network. Instead, router 30 simply drops the 1024 byte UDP packet and the packet never arrives at destination machine 50.

In a real-time video teleconferencing or other such application tolerating unreliable data transmission, this implies that a video/audio frame is permanently lost. Since a main objective of video/audio transmission is to have a fluid "real-time" stream of data, issuing a retry or trying to send the lost packet at a later time is a useless exercise. For example, assume that source machine 10 were to send an audio message as UDP packets which said, "we are going to work today and not tomorrow". If the words "toddy and" were a separate UDP packet which was dropped at router 30, but then later re-sent as smaller fragments by source machine 10 such that it could be transferred by router 30, then the message at the destination machine may appear in real-time as, "we are going to work not tomorrow today and". Thus, a retry and re-send of the packet containing the words "today and" would be played back at destination machine 50 after the words preceding "today and" in the original message had already been played, thereby making the resultant message garbled and disordered. For this reason, UDP type messages are used wherever unreliable data transmission is tolerable, and where retries and fragmentation are to be avoided. Rather, UDP tolerates dropped packets, which may appear as "pops" in audio data, or missing frames in video data, as a necessary cost of preventing garbling and disordering of the data and preserving real-time continuity at destination machine 50. Other types of data tolerating dropped packets are cursor control positions from an input device (described below).

In one embodiment of the present invention, the Internet Control Message Protocol (ICMP) echo is used to send a test message packet of an arbitrary test packet size from source machine 10 to destination machine 50 before sending any user data in the forthcoming UDP data transfer by the user. Further, any suitable echoing or message protocol can be utilized according to the various embodiments of the present invention to discover the largest acceptable packet size across a network. Though the embodiments of the present invention have been described with respect to the router configuration shown in FIG. 1, it will be appreciated by one skilled in the art that the various embodiments of the present invention may be utilized in any arbitrary router configuration.

Figure 2:
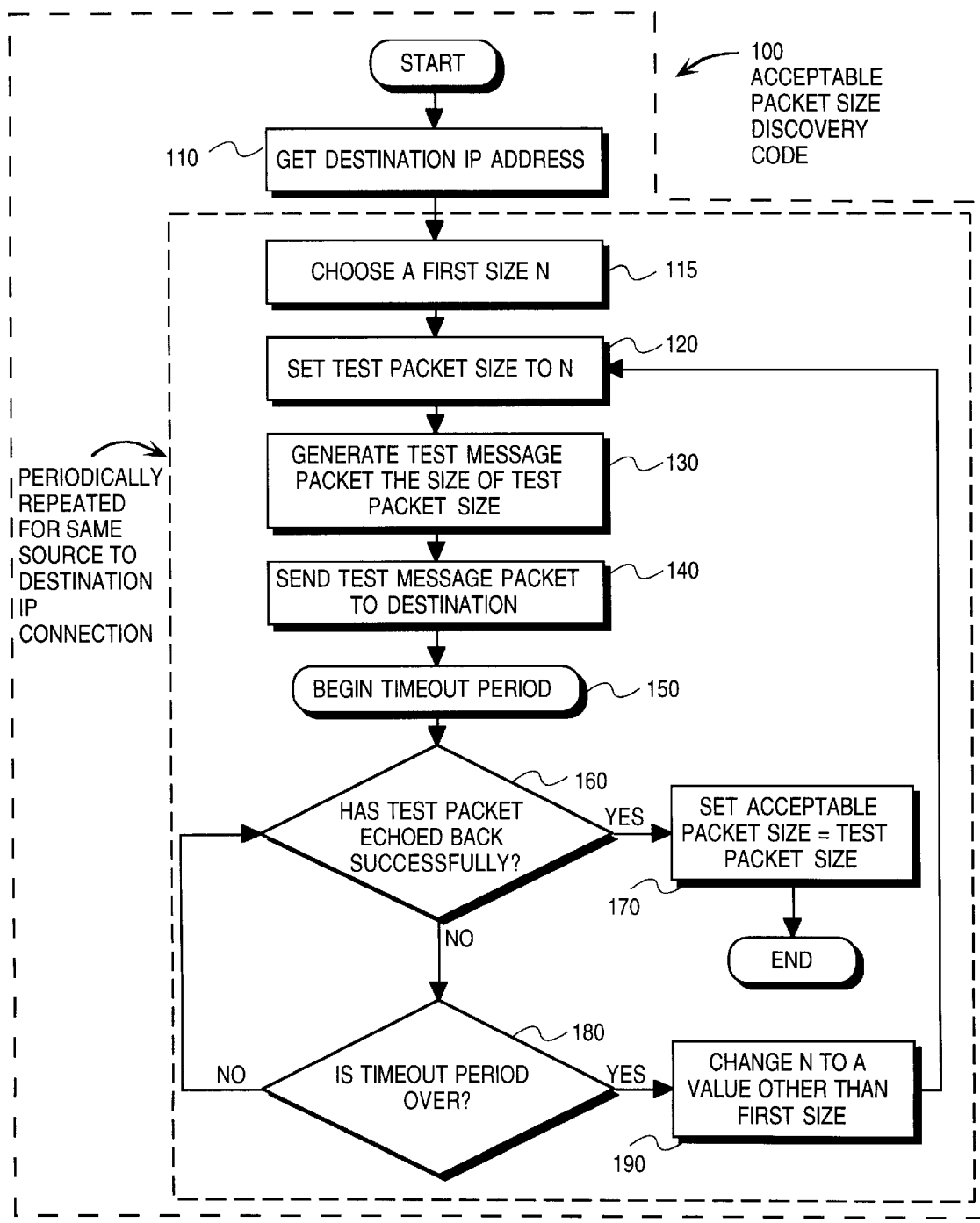
FIG. 2 is a flowchart showing the steps involved in discovering the largest UDP packet size allowed by the network according to an embodiment of the present invention.

FIG. 2 is a flowchart of the steps involved in implementing one embodiment of the present invention. Acceptable packet size discovery code 100, shown in FIG. 2, may be implemented through hardware, software or firmware. According to step 110, the source machine receives or gets a destination IP address. The destination IP address indicates where on the network the destination is located. Before the user connection between a source machine and a destination machine is initiated such that the user can send receive information to and from the destination machine, test packet is sent to the destination machine according to this embodiment of the present invention.

Continuing with FIG. 2, according to step 115, size N, preferably a large number relative to what most routers are capable of handling, is chosen. Then N is set as the test packet size according to step 120. According to step 130, a test message (datagram) of the test packet size is created.

The datagram may be any arbitrary sequence of bits which equals the test packet size set at N. Next, according to step 140, utilizing the ICMP echo or other messaging protocol, the test message is encapsulated (see encapsulation described below) with headers into a test message packet. According to step 150, as soon as the test message packet is sent to the destination machine over the network, a timeout period of a specified length is begun. The timeout period length may be arbitrary or based upon some test or formula. According to step 160, the source machine constantly listens for the test message packet sent to the destination machine to be successfully echoed back intact from the destination machine. If at any point during the timeout period, the test message packet is determined to be successfully echoed back to the source machine, then according to step 170 the acceptable packet size is set as the test packet size.

According to step 180, the source machine checks to see if the timeout period is completed. If the timeout period is over and according to step 160, no test message packet was successfully echoed back to the source machine, then according to step 190, the size of N is modified, and in the typical case, made smaller. It is assumed at this point that the previous test packet size was too large and that the test message packet did not successfully echo back to the source machine because one of the routers along the network path from the source to the destination couldn't handle that large a size packet. After N is modified, a new test packet size is set equal to the new N and steps 130 through 190 repeat. This process continues prior to the initiation of the IP connection by the user until an acceptable packet size is discovered. As described earlier, the N chosen may start at its first size as a large size such as 1470 bytes and on the next iteration, N may be made a smaller size such as 1024 bytes.

Steps 110 through 190 of the method of FIG. 2 are periodically repeated during a specified source to destination IP data connection session in which a user may interact. In a "connectionless" protocol such as IP, though the source and the destination may remain the same, the pathways and routing through which the data is sent may change depending on network conditions. Thus, during the user's data connection to a destination machine, a larger acceptable packet size may be periodically discovered, thereby increasing the overall efficiency of the data transfer (larger packets yield higher efficiency). Further, when the user or the software has chosen a new or different destination IP address, before that new connection to the next destination IP address is initiated, the method shown in FIG. 2 can begin anew to find the largest acceptable packet size for the new connection.

Ideally, the value N will start at a large value, such as 1470 byte for Ethernet (or 3800 bytes for FDDI) and be decremented to smaller sizes such as 512 bytes, in order to ensure that the acceptable packet size is the largest acceptable packet size that all routers will support. To reduce the time consumed in discovering the largest acceptable packet size, the timeout period and the periodic intervals at which the largest acceptable packet size is rediscovered may be set optimally, such that discovery of an acceptable packet size does not seriously interfere with the overall data transfer rate.

FIG. 3 shows how data messages using TCP and using UDP are encapsulated into TCP and UDP packets. These packets include the actual data to be transmitted (datagrams), as well as header information which shows where and how the data is to be transferred and disassembled. As is shown in the Format of a UDP packet 200 in FIG. 3, a UDP packet has very little overhead and includes only a source port, a destination port, a length and a UDP checksum. The source port and destination port correspond to the source IP address and destination IP address, respectively, between which data is to be transferred by the user or software. The length field in the UDP header indicates the size of the message to be transmitted. In the case of sending a test message packet, this would be the test packet size shown in FIG. 2. Finally, the UDP header contains a checksum, which is a single number representing the sum of the number of bits which are either zero or non-zero (or the 1's complement of the sum) which is later compared as a way of ensuring reliability of the data transferred. The checksum is compared with the checksum of the datagram that is actually received and if the two numbers are identical, then a certain degree of reliability is assured. If the two numbers are different however, this assures that the data was not received intact or error-free.

FIG. 3 also shows the Format of a TCP packet 250 with a number of different fields within its header information. A TCP packet requires extra overhead to facilitate TCP as a "stream oriented" and "reliable" protocol. TCP is "stream oriented" because the packet size sent is not crucial to the packet being lost. A large-sized TCP packet is fragmented into smaller size packets by routers automatically. Part of the fragmentation instructions lie within the fields of the header and add to TCP overhead. Further, TCP is "reliable" in that while it does not guarantee transfer of data, it does guarantee echoing back an error message indicating that the data was unable to be transferred and why. TCP fragments large packets, re-transmits lost packets and acknowledges when packets are ultimately unable to be transferred. UDP, on the other hand, includes none of these features, and consequently has a header with fewer fields and less overhead. If a UDP packet is dropped or corrupted, the packet is lost forever.

Thus in video and audio for example, using UDP is more desirable than TCP since the lower overhead allows more message bytes to be transferred in any one packet over TCP. The potential packet loss is tolerable since in real-time transfer of video and audio, the overall coherency and flow of the data out to the destination is more vital than ensuring that every data packet is transferred.

Figure 4:
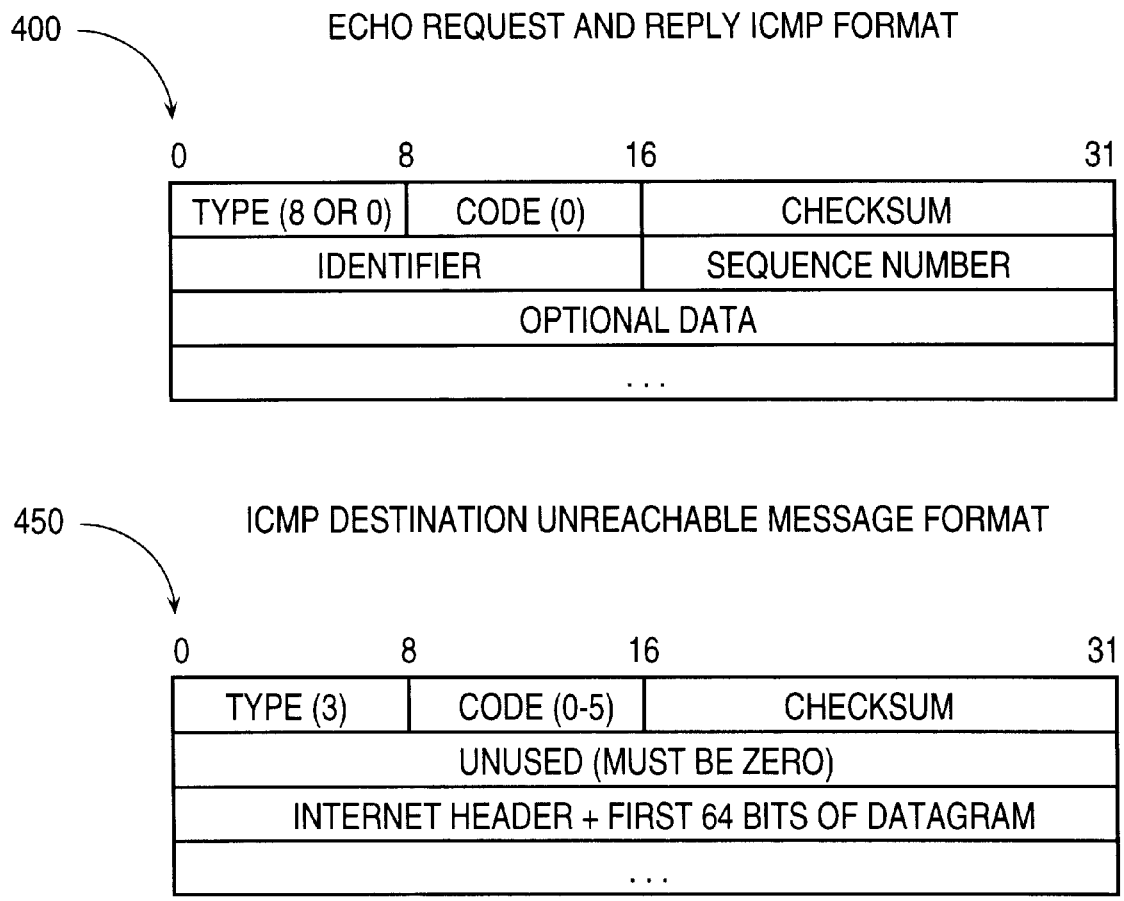
FIG. 4 is a design showing ICMP message formats.

FIG. 4 shows the format of ICMP echo request and reply messages as well as the format of a ICMP destination unreachable message.

Various embodiments of the present invention utilizes ICMP or other message echoing protocol in discovering acceptable packet size. In the case of ICMP, the source machine sends an ICMP echo request in the Echo Request and Reply ICMP format 400 shown in FIG. 4 to a destination machine. The destination machine which receives the ICMP echo request formulates an echo reply and returns it to the source machine. The echo request is sent upon the user/software invoking a command such as a "ping" on the source machine. The echo request as shown in FIG. 4 also contains an optional data area which, in an embodiment of the present invention, is utilized to hold the test message.

When the test message packet is echoed back successfully as an echo reply message, this indicates, among other conditions, that intermediate gateways and routers between the source and destination were able to route and transfer the packet successfully. ICMP messages exhibit characteristics similar to UDP in that ICMP messages do not fragment or retry of their own accord. Therefore, ICMP nicely emulates UDP such that an ICMP packet is also permanently dropped by a router if it is too large in size.

Six fields are shown in the echo request/reply format 400 of FIG. 4. The first field is a type identifier showing the type of ICMP message sent. An "8" represents an echo request while a "0" represents that the message is an echo reply. The "code" field indicates the status of a problem with the message in the case of an echo reply. The code can pinpoint the specific problem that occurred during transmission. The checksum field, as described earlier, is the sum or 1's complement of the sum of bits in the data field, used to verify that the message which arrived at the destination was identically echoed back to the source. The identifier and sequence number fields are used by the source machine to match a particular reply with a particular request in the case that they arrive out of order or the network is sending multiple test packets. The "optional data" field is used to send the test message generated by the source machine. The optional data field should contain exactly the same bits and in the same order when sent as an echo reply as it had when sent as the echo request.

When a gateway or router cannot transfer over the ICMP packet, ICMP sometimes sends a destination unreachable message back to the source machine, in the format 450 shown in FIG. 4. A type identifier of 3 in the type field indicates that it is a destination unreachable message. The "code" field with values from 0–5 indicates the source of error or specific problem. The checksum field is also provided as described earlier. An unused field is also provided. Finally, the data field will contain the Internet header from the IP connection as well as the first 64 bits of the datagram (message) thereby identifying to the source which message did not reach the destination. Though other embodiments of the present invention do not listen for a destination unreachable message, this message type may be utilized to cut short the timeout period by ending the timeout and re-testing with a new test size upon receiving the proper destination unreachable message. However, most routers do not return a destination unreachable message particularly when an ICMP has a "Don't Fragement" bit set thereby instructing the routers not to fragment the message. If a router were to return a destination unreachable message with a code of 4, then the source would be informed that fragmentation was required and the "Don't Fragment" bit was set. The source could then toggle off the "Don't Fragment " bit and allow the packet to go through. However, this is undesirable in the case of UDP packets which should not be fragmented, and therefore, it is undesirable for the ICMP test message as well. Several embodiments of the present invention, rather than listen for destination unreachable message, wait for an echo reply to the specific echo request and ignore the destination unreachable message.

Figure 5:
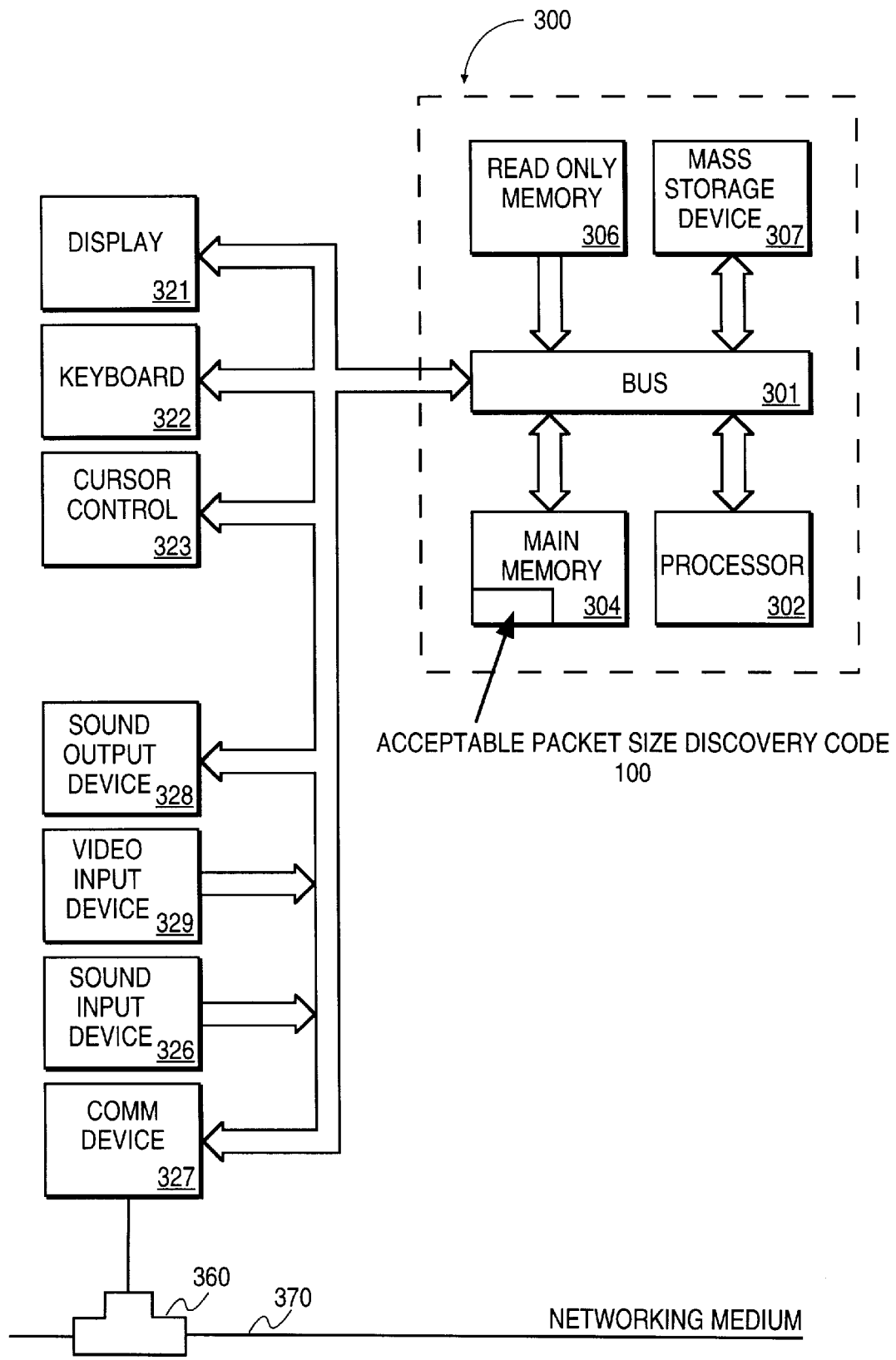
FIG. 5 is a diagram showing a computer system capable of implementing an embodiment of the present invention.

FIG. 5 is a diagram showing a computer system embodiment of the present invention.

A computer system, such as a workstation, personal computer or other processing apparatus is detailed in FIG. 5. The sub-system 300 of the computer system comprises a bus or other communication means 301 for communicating information, and a processor 302 coupled with bus 301 for processing information. Sub-system 300 further comprises a random access memory (RAM) or other volatile storage device 304 (referred to as main memory), coupled to bus 301 for storing information and instructions to be executed by processor 302. Main memory 304 also may be used for storing temporary variables or other intermediate information during execution of instructions by processor 302. Sub-system 300 also comprises a read only memory (ROM) and/or other static storage device 306 coupled to bus 301 for storing static information and instructions for processor 302, and a mass storage device 307 such as a magnetic disk or optical disk and its corresponding disk drive. Mass storage device 307 is coupled to bus 301 for storing data and instructions.

Sub-system 300 may further be coupled to a display 321 such as a cathode ray tube (CRT) or liquid crystal display (LCD) couple to bus 301 for displaying information to a computer user. Such a display 321 may further be coupled to bus 301 for the receipt of video or image information. An alphanumeric input device, such as keyboard 322, including alphanumeric and other keys may also be coupled to bus 301 for communicating information and command selections to processor 302. An additional user input device is cursor control 323, such as a mouse, a trackball, stylus, cursor direction keys, coupled to bus 301 for communicating direction information and command selections to processor 302, and for controlling cursor movement on display 321. For use in video teleconferencing applications, sub-system 300 may also have coupled to it a sound output device 328, a video input device 329, and sound input device 326, along with the associated D/A (Digital-to-Analog) and A/D (Analog-to-Digital) converters or software codecs for inputting or outputting media signal bitstreams. Sub-system 300 may further be couple to communication device 327 which is coupled to network adapter 360 for communicating with other computers over network 370. The processor can generate a test message and store it temporarily in main memory 304 or mass storage device 307. The test message may be then encapsulated into an ICMP packet along with header information which the processor generates from input by the user using keyboard 322 and/or cursor control 323 or receives from network adaptor 360.

Main memory 304 is shown as having loaded the acceptable packet size discovery code 100 shown in and described for FIG. 2. Alternatively, processor 302 or other components of sub-system 300 may store/load code for the embodiment of FIG. 2 or any of the other embodiment described herein. The processor also stores in main memory 304 or mass storage device 307, the current testing size used and stores in a counter, the timeout. Processor 302 issues commands to decrement the timeout counter and also to change the testing size if a successful echo is not received and re-issues commands to generate a new testing message. Memory 304 or mass storage device 307 stores the acceptable packet size when discovering and keeps track of what intervals, again by using main memory 304 or mass storage device 307, to repeat discovery of an acceptable packet size. UDP packets of the acceptable packet size may be generated from date received from sound input device 326, video input device 329, cursor control 323 or from mass storage device 307 or any other input stream.

Note, also, that any or all of the components of the system shown in FIG. 5 and associated hardware may be used in various embodiments, however, it can be appreciated that any configuration of the system may be used for various purposes according to the particular implementation.

In one embodiment, sub-system 300 is one of the Apple Computer® brand family of personal computers such as the Macintosh 8100 brand personal computer manufactured by Apple Computer, Inc. of Cupertino, Calif. Processor 302 may be one of the PowerPC brand microprocessors manufactured by Motorola, Inc. of Schaunbhtrg, Ill.

Although a general purpose computer system has been described, it can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 6:
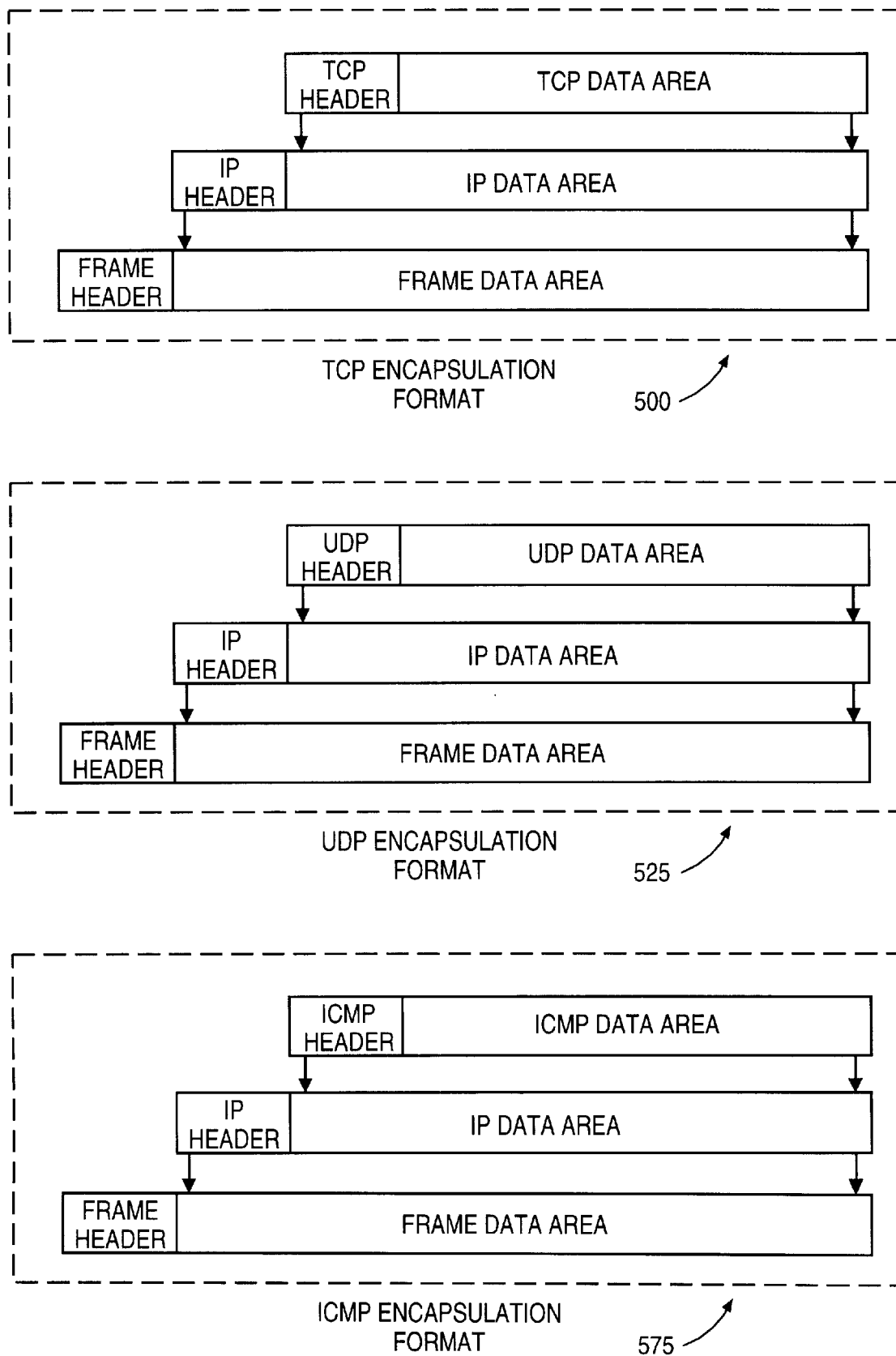
FIG. 6 is a diagram showing UDP, TCP and ICMP encapsulation.

FIG. 6 shows how TCP, UDP and ICMP messages are encapsulated into frames before being sent. TCP encapsulation 500 shows that TCP data and header(s) are encapsulated or become part of the IP data area. The IP data area and IP header shown in TCP encapsulation 500 are then encapsulated into a frame data area of a frame. A frame is lowest level data structure physically transferred across networks. The frame also includes its own header. Likewise, UDP encapsulation format 525 shows that UDP data and header are encapsulated within the IP data area. The IP data are and IP header are then encapsulated in the data area of a frame, just like TCP. UDP and TCP differ in the format and content of their header, but not in the manner in which they are encapsulated into IP and further, into a frame for actual network transfer.

ICMP encapsulation format 575 is identical to the encapsulation of UDP and TCP. ICMP message and header are encapsulated into the IP data area and then concatenated with an IP header. This IP packet is then further encapsulated into the data area of a frame. ICMP differs from UDP and TCP in that rather than being a protocol primarily designed for the transport of raw data, it is used as an echoing protocol to determine conditions of network transfer.

The header fields and data shown for TCP and UDP in FIG. 3 and ICMP in FIG. 4 are encapsulated into these layers before actual network transfer. Routers process all the various headers and try to send the message the data area. It is at this stage that data is potentially dropped.

Figure 7:
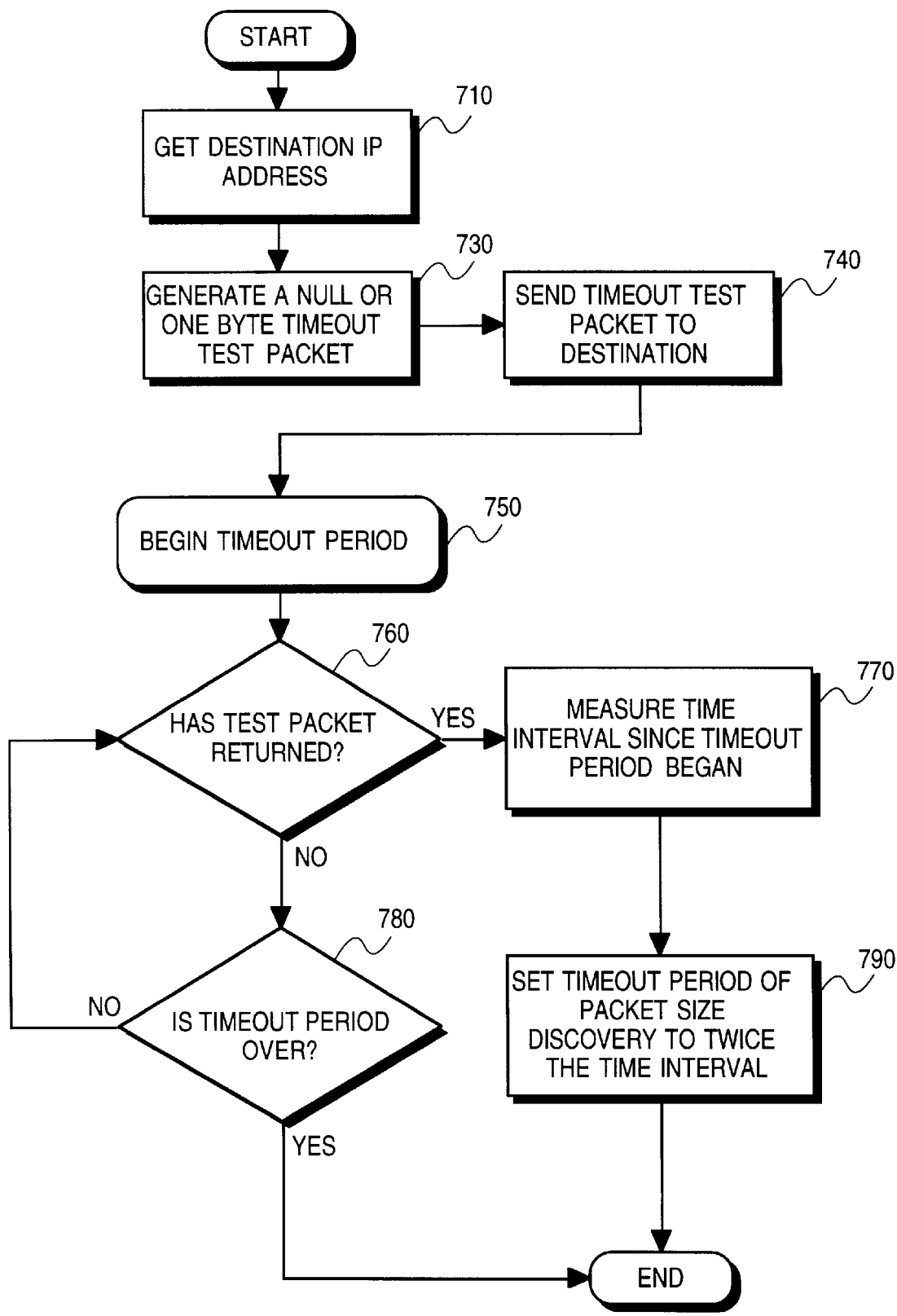
FIG. 7 is a flowchart showing the steps involved in discovering an appropriate timeout period for use in discovering acceptable packet size.

FIG. 7 is a flowchart showing yet another embodiment of the present invention where an appropriate timeout period can be assessed.

According to step 710, the source machine receives or gets a destination IP address. The destination IP address indicates where on the network the destination is located. According to step 730, a test timeout packet with a null or one-byte datagram is generated. The test timeout packet is, preferably, an ICMP message with a null or one byte datagram portion, but will have the headers of standard ICMP message as shown in FIG. 4. The timeout test packet, according to step 740, is then sent to the destination, designated by the destination IP address. A timeout period, according to step 750 is begun. Since the test packet is known to have only a null or one byte datagram portion, and the headers associated with it are a known size, timeout period of several hundred milliseconds is typically adequate.

At step 760, the source is listening during the timeout period to see if the timeout test packet has returned to the source machine. If the timeout test packet has returned during the time-out period, then according to step 770, the time interval from when the timeout period began to the present is measured. If the test timeout packet has not returned, then step 780 checks to see if the timeout period has ended. The time interval represents the amount of time it took the timeout test packet to be returned (echoed) back to the source. At step 790, the timeout period used in packet size discovery is set as twice measured time interval. It will be appreciated by one skilled in the art, that depending on network distance and potential packet size conditions, the timeout period used in packet size discovery could be set as a different multiple of the measured time interval, but in most cases will be a minimum of the time interval measured.

By discovering an appropriate timeout period according to the results of the method of FIG. 7 employed in packet size discovery, the distance between the source and destination and the relative ease/difficulty of reaching the destination can be taken into account when establishing the timeout period. This avoids having an arbitrarily large timeout period which will waste time or having too small a timeout period such that the test message packet during packet size discovery does not have the opportunity to echo back to the source. The timeout period set by the method of FIG. 7 may be utilized in other embodiments of the invention in order to discover the acceptable packet size. The results of FIG. 7 may be fed into the setting of length of the timeout period begun at step 150 of FIG. 1. Thus, a counter or other clocking device may be loaded with a value resultant from the method of FIG. 7 to set the timeout period. Likewise the discovering of an approriate timeout period may be utilized in the embodiment described below for FIG. 8, and specifically, the timeout period discovered can be fed into step 880 to set the timeout period.

Figure 8:
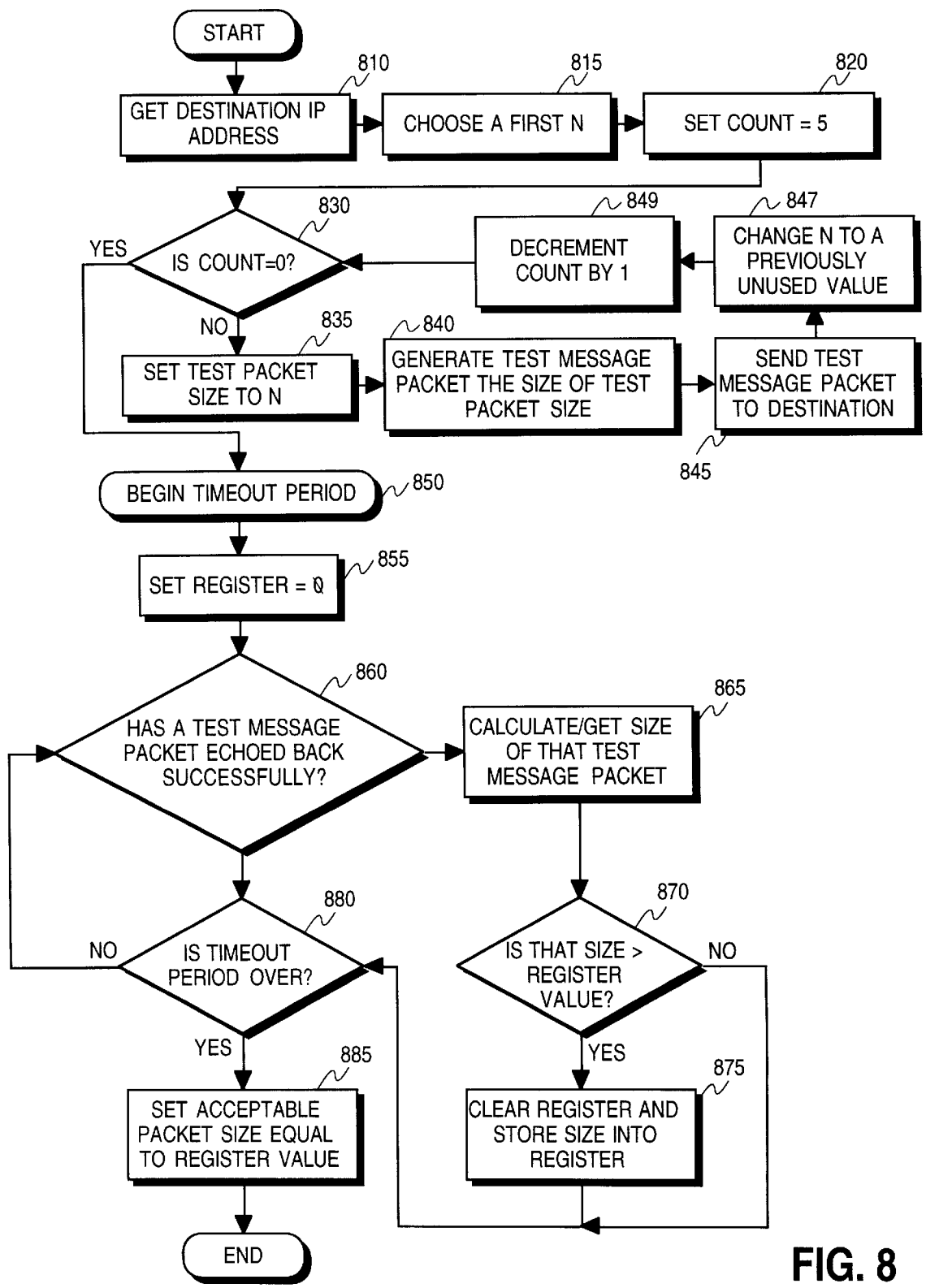
FIG. 8 is a flowchart of the steps involved in another embodiment of the present invention.

FIG. 8 shows yet another embodiment of the present invention.

In FIG. 8, 5 different test packet sizes are chosen and all five test messages are set to the destination consecutively. According to step 810, the source receives or gets a destination IP address. Then, at step 815, a first N is chosen. Optimally a large value such as 3800 bytes should be chosen as the first N. According to step 820, a counter or register named count is loaded with a value of 5. This counter ensures that the steps of sending a test message packet is repeated five times. Note that five is an exemplary repeat value and depending on the implementation, any number of test packets may be sent, thus the initial count value can be any appropriate integer. However, in the instant example of five different test packets each with a different test message size, the following values may be used: 3800 bytes, 1470 bytes, 1024 bytes, 512 bytes and 256 bytes. However, as described earlier, these values are merely exemplary and do not represent the fullest possible range of test sizes that can be used.

According to step 830, count is checked for a zero or non-zero value. If count is not zero, test messages remain to be generated and sent. Steps 835 through 845 are identical to steps 120–140 described for and shown in FIG. 2. Then the test packet size is set equal to N according to step 835. According to step 840, a test message (datagram) is created. The datagram may be any arbitrary sequence of bits which equals the test packet size set at N. Also, according to step 840, utilizing the ICMP echo or other messaging protocol, the test message is encapsulated (see encapsulation described below) with headers into a test message packet. At step 845, the message packet is sent to the destination. Immediately thereafter, at step 847, a different N is chosen than previously used N values. For instance, the second value of N can be set at 1024 bytes. At step 849, the value of count is decremented by one. Then steps 830 through 845 repeat for N=1024 bytes, and then restarts with yet another N according to step 847. Once count is fount to equal zero at step 830, however, the process of generating and sending test messages ends.

According to step 850, as soon as all the test message packets are sent to the destination machine over the network, a timeout period of a specified length is begun. Then, a register or other memory is cleared (set to zero) at step 855. At step 860, the source is constantly listening to see if any of the five test message packets have successfully echoed back to the source. If a test message packet is returned, then at step 865, the size of the returned test message packet is calculated using the headers and/or datagram portions of the test message packet. The test message packet size is then compared with the register value at step 870. If the calculated test message size is greater than the register value, then at step 875, the register is cleared, if necessary, and register stores the new size. Thus, if a 1024 byte packet is the only one returned, the register will have a value of 1024. Thereafter, if any other test message packets are received, only larger packet sizes will affect the value of the register. According to step 880, the source machine checks to see if the timeout period is completed. Once the timeout period is completed, at step 885, the acceptable packet size is set equal to the value of register. If the timeout period is not over, then the source machine is constantly listening for a new returned test message packet. The value of register and consequently of the acceptable packet size will be the size of the largest successfully echoed test message packet. In the extreme case, if none of the test message packets are echoed back, the register will continue to have a value of zero. This case may indicate a downed network or unreachable destination.

We claim:

1. A method for discovering an acceptable packet size over a path that utilizes a user datagram protocol (UDP) for packets from a source to a destination, said method comprising the steps of:

choosing a first size as a testing size;

sending a test message packet with a test message using an echoing protocol, said test message the size of said testing size from said source to said destination; and checking during a specified timeout whether said test message packet is successfully echoed back, and if said test message packet is successfully echoed back, setting said acceptable UDP packet size equal to said testing size.

2. A method for discovering an acceptable packet size according to claim 1 further comprising the step of choosing a new size other than said first size as said testing size if during said specified timeout said test message packet fails to be successfully echoed to said source and then repeating said steps of sending and checking using said new size.

3. A method for discovering an acceptable packet size according to claim 2 wherein said discovery of an acceptable UDP packet size is performed prior to initiating a user connection for data transmission from said source to destination.

4. A method for discovering an acceptable UDP packet size according to claim 2 wherein said discovering an acceptable packet size is performed prior to initiating a user connection for data transmission from said source to destination.

5. A method for discovering an acceptable packet size according to claim 2 wherein said first size is the smallest of a range of sizes and the sizes other than said first size are larger sizes.

6. A method for discovering an acceptable packet size according to claim 2 wherein said first size is the largest of a range of sizes and sizes other than said first size are smaller sizes.

7. A method for discovering an acceptable packet size according to claim 1 wherein said test message is an Internet Control Message Protocol type message.

8. A method for discovering an acceptable packet size according to claim 1 wherein said step of sending a test message packet includes the steps of generating said test message and a set of headers and encapsulating said test message and said set of headers into said test message packet.

9. A testing apparatus for discovering an acceptable packet size over a network utilizing a user datagram protocol (UDP) for packets, said apparatus comprising:

a source machine coupled to said network, wherein said source machine chooses a first size as a testing size;

a test message packet coupled to and generated by said source machine, said test message packet encapsulating a test message of length testing size; and a destination machine coupled to said network to receive and echo said test message packet back to said source machine, wherein if said test message packet is successfully echoed to said source machine, said source machine is adapted to set said testing size as said acceptable UDP packet size.

10. A testing apparatus according to claim 9 further comprising a counter coupled to said source machine, said counter counting a timeout period within which if said test message packet does not successfully echo to said source machine, said source machine is adapted to choose a new testing size.

11. A testing apparatus according to claim 10 further comprising a new test message packet coupled to and generated by said source machine of a new testing size if said counter signals an end to said timeout period, said new testing size generated by decrementing a counter loaded with a previous testing size.

12. A testing apparatus according to claim 9 wherein said test message packet is coupled to said source machine and received by said destination machine as an Internet Control Message Protocol message.

13. A testing apparatus according to claim 9 wherein said test message packet comprises a test message and associated header information.

14. In a computer system, a network testing apparatus, said network utilizing a user datagram protocol (UDP) for packets, comprising:

a processor coupled to said network to generate a testing message of a test size, said processor coupled to said network further to receive an echo of said testing message; and a memory coupled to said processor, to store an acceptable UDP packet size as the size of a successfully echoed testing message if said successful echo occurs within a timeout period calculated by said processors and said memory.

15. A method for discovering an acceptable packet size over a path utilizing a user datagram protocol (UDP) for packets, from a source to a destination, said method comprising the steps of:

choosing a plurality of sizes as testing sizes' sending a test message packet having a test message, said test message the size of and corresponding to each of said testing sizes from said source to said destination; and checking during a specified timeout whether any of said test message packets are successfully echoed back, and if any of said test message packets are successfully echoed back, setting said acceptable UDP packet size equal to largest of said testing sizes of said echoed test message packets.

16. A method for discovering an appropriate timeout period for use in discovering acceptable packet size utilizing a user datagram protocol (UDP) over a path from a source to a destination, said method comprising the steps of:

choosing a null testing size;

sending a test message packet with a test message, said test message the size of said testing size from said source to said destination, said test message packet having a null datagram; and checking during a specified timeout whether said test message packet is successfully echoed back, and if said test message packet is successfully echoed back, setting said appropriate timeout period for use in discovering packet size equal to a multiple of a time interval said time interval measured from the beginning of the timeout to the time when said test message packet was successfully echoed back.

17. A method for discovering an acceptable packet size that utilizes a user datagram protocol (UDP) over an arbitrary network pathway, from a source to a destination said pathway having relaying nodes between said source and destination, said method comprising the steps of:

choosing a first size as a testing size;

sending a test message packet with a test message, said test message the size of said testing size from said source to said destination;

checking during a specified timeout whether said test message packet is successfully echoed back, and if said test message packet is successfully echoed back, setting said acceptable UDP packet size equal to said testing size; and choosing a new size other than said first size as said testing size if during said specified timeout said test message packet fails to be successfully echoed to said source and then repeating said steps of sending and checking using said new size, the failure of a successful echo indicating that said testing size exceeds the capability of at least one of said relaying nodes.

18. A method for discovering an acceptable packet size over a path that utilizes a user datagram protocol UDP for packets from a source to a destination, said method comprising the steps of:

choosing a first size as a testing size;

sending a test message packet with a test message using an echoing protocol, said test message the size of said testing size from said source to said destination; and checking during a specified timeout whether said test message packet is successfully echoed back, and if said test message packet is successfully echoed back, setting said acceptable UDP packet size equal to said testing size.

* * * * *